United States Patent

Volz et al.

[11] Patent Number: 5,932,945
[45] Date of Patent: *Aug. 3, 1999

[54] MOTOR-AND-PUMP ASSEMBLY

[75] Inventors: Peter Volz, Darmstadt; Hans-Dieter Reinartz, Frankfurt am Main; Dieter Dinkel, Eoostein/Ts., all of Germany

[73] Assignee: ITT Manufacturing Enterprises, Inc., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/849,241

[22] PCT Filed: Dec. 15, 1995

[86] PCT No.: PCT/EP95/04980

§ 371 Date: Aug. 14, 1997

§ 102(e) Date: Aug. 14, 1997

[87] PCT Pub. No.: WO96/19031

PCT Pub. Date: Jun. 20, 1996

[30] Foreign Application Priority Data

Dec. 15, 1994 [DE] Germany .................. 44 44 644

[51] Int. Cl.⁶ .............. H02K 7/14; H02K 5/14; F04B 17/03

[52] U.S. Cl. ............. 310/89; 417/423.15; 310/67 R; 310/42

[58] Field of Search .................. 310/89, 88, 85, 310/67 R, 238, 239, 42; 417/423.15, 423.7, 423.9, 423.11

[56] References Cited

U.S. PATENT DOCUMENTS

| | | | |
|---|---|---|---|
| 1,983,262 | 12/1934 | Zorzi | 417/423.15 |
| 3,269,322 | 8/1966 | Lotspih | 310/88 |
| 3,527,971 | 9/1970 | Means | 310/239 |
| 4,336,473 | 6/1982 | Wetters et al. | 310/88 |
| 4,847,528 | 7/1989 | Eguchi et al. | 310/239 |
| 4,900,957 | 2/1990 | Barker et al. | 310/62 |
| 5,015,897 | 5/1991 | Inagaki et al. | 310/83 |

FOREIGN PATENT DOCUMENTS

| | | | |
|---|---|---|---|
| 94118 | 8/1962 | Denmark | 417/423.15 |
| 1281446 | 12/1961 | France | 417/423.15 |
| 605134 | of 0000 | Germany . | |

(List continued on next page.)

OTHER PUBLICATIONS

English translation of the International Preliminary Examination Report of Application No. PCT/EP95/04980 filed Dec. 15, 1995.

German Patent Application No. G 86 06 067.8 dated Aug. 7, 1986.

(List continued on next page.)

*Primary Examiner*—Nestor Ramirez
*Assistant Examiner*—Burton S. Mullins
*Attorney, Agent, or Firm*—Rader, Fishman & Grauer PLLC

[57] ABSTRACT

A motor-and-pump assembly includes armature shaft of the electric motor which is retained in the pump housing by way of a main bearing and an auxiliary bearing.

The objective is to align the motor housing centrically to the axis of the armature and, in addition, to achieve a reliable attachment of the motor housing to the pump housing.

Therefore, the housing of the electric motor has a bowl-shaped design, and the rim of the motor housing is inserted into a concentrically circumferential groove in a flange surface on the pump housing. The diameter of the inner wall of the groove corresponds to the inside diameter of the motor housing. Thus, the inside wall of the motor housing abuts on the inner rim of the groove. The motor housing is thereby aligned centrically.

The motor housing can simply be fastened to the pump housing by a clamping ring which is also inserted into the groove.

8 Claims, 3 Drawing Sheets

FOREIGN PATENT DOCUMENTS

| | | |
|---|---|---|
| 4110971 | 10/1992 | Germany . |
| 4142993 | 7/1993 | Germany . |
| 4235962 | 5/1994 | Germany . |
| 4315826 | 11/1994 | Germany . |
| 596697 | of 0000 | Switzerland . |
| WO8700250 | 1/1987 | WIPO . |
| WO9619031 | 6/1996 | WIPO . |

OTHER PUBLICATIONS

German Patent Application No. 6802635.7.

German Search Report of the German Patent Office Relating to Parent German Patent Application No. 44 44 644.6.

German Patent Application No. G 93 20 524.4 dated Oct. 6, 1994.

German Patent Application No. 11,502 dated Jul. 14, 1966.

German Patent Application No. G 94 13 844.3 dated Dec. 8, 1994.

German Patent Application No. G 94 00 843.3 dated Sep. 7, 1992.

MOTOR-AND-PUMP ASSEMBLY

BACKGROUND OF THE INVENTION

The present invention relates to a motor-and-pump assembly including an electric motor with a motor housing and a pump with a pump housing, and an armature shaft with an extension which reaches into a stepped bore in the pump housing where it is retained by at least one main bearing.

An assembly of this type is disclosed in German patent application No. 42 35 962, for example. The motor housing is centered with respect to the armature shaft which is retained in the pump housing by way of a main bearing as follows:

The main bearing projects slightly from a flange surface on the pump housing. A brush support plate having a centric indentation is mounted on the bearing which projects from the flange plane. The brush support plate is thereby aligned in a radial direction relative to the projecting bearing. Further, the brush support plate has a radially outward rim onto which the housing is slipped. Thus, the motor housing is centered by way of the brush support plate, which is aligned centrically on the flange surface and, consequently, by way of the main bearing which is slipped into the pump housing.

It is easily comprehensible that the brush support plate requires intricate machining. Especially the inside rim, which abuts on the bearing, and the outside rim, on which the housing is slipped, must be manufactured with accurate tolerances relative to one another.

However, the brush support plate is a component which is generally made by injection molding. The injection molding process does not permit a high degree of precision.

Thus, a basic object of the present invention is to ensure by simple means that the motor housing is exactly aligned relative to the axis of the armature shaft.

SUMMARY OF THE INVENTION

This object is achieved by a motor-and-pump assembly with a flange surface on the pump housing which includes a groove extending concentrically to the stepped bore, into which groove the motor housing with its rim can be mounted.

The present invention will be described in detail hereinbelow by way of two embodiments. Each of the embodiments is described in a Figure.

DETAILED DESCRIPTION OF THE DRAWINGS

Figure 1:
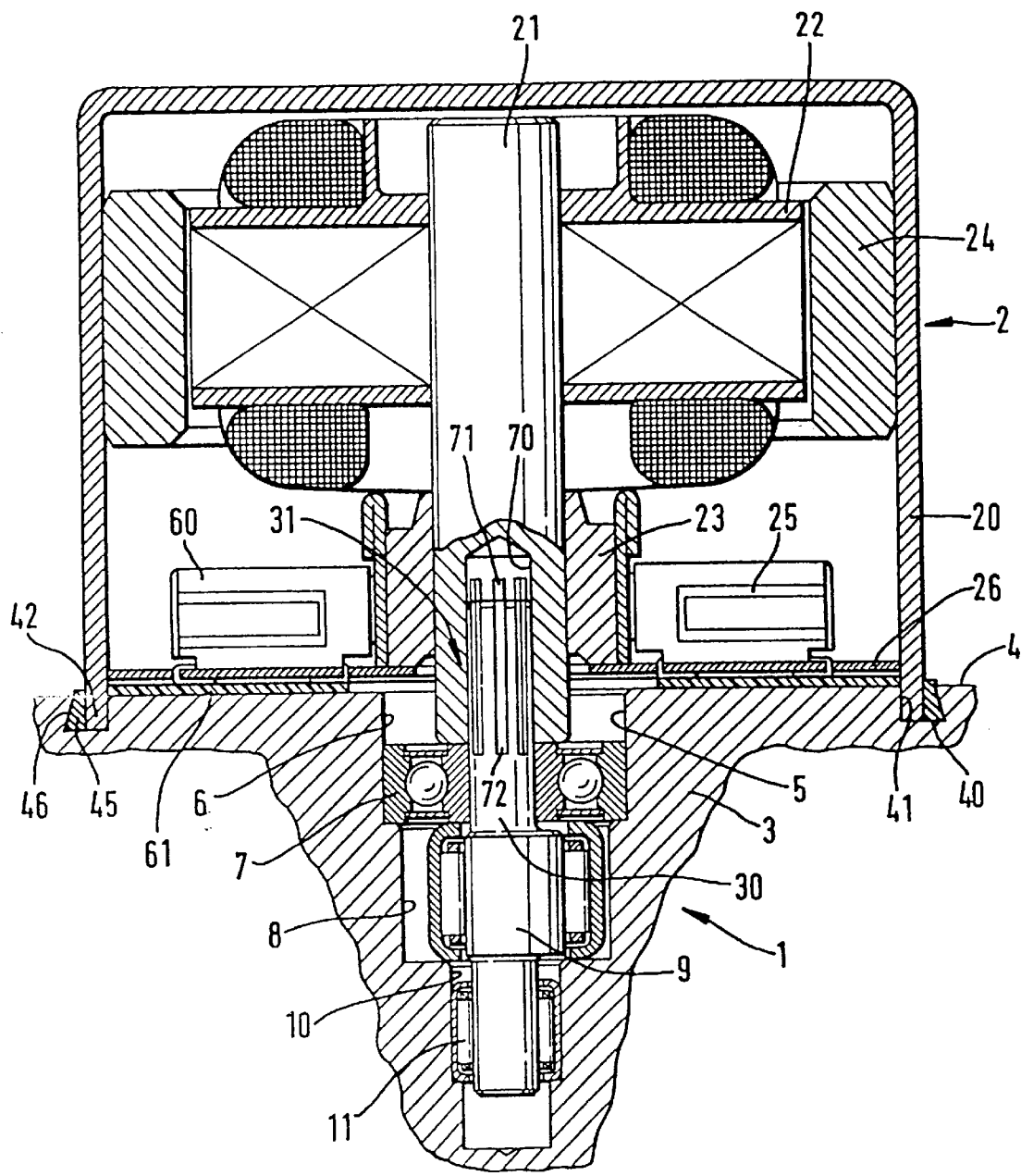
FIG. 1 show s a cross-section through a first embodiment of a motor-and-pump assembly.

Reference numeral 1 designates a pump, reference numeral 2 designates an electric motor. Pump 1 is comprised of a housing 3, only part of which is shown in the drawing. It is important that the housing has a generally flat flange surface 4 into which a blind-end bore 5 opens. A main bearing 7 is provided in a first step 6 which directly succeeds the flange surface 4. The bearing is a ball bearing having an inner ring and an outer ring. A second step 8 follows the first step 6. Transverse bores (not shown), in which the pump pistons move, open into second step 8. The end surfaces of the pump pistons bear against an eccentric 9 arranged in the second step 8. Third step 10 is used to accommodate an auxiliary bearing 11 configured as a needle bearing.

The electric motor is generally comprised of a bowl-shaped housing 20 which, with its open side, faces the flange surface 4. An armature shaft 21 which carries an armature 22 and a collector 23, is arranged in the axis of the housing 20. Permanent magnets 24 are mounted on the inside of the housing 20. Brushes 25, attached to a support plate 26, abut on the collector 23. As is obvious to the one skilled in the art, the above components are the basic elements of a direct-current commutator motor.

The armature shaft 21 includes an extension 30 which projects into the blind-end bore 5. Extension 30 in FIG. 1 is a separate element which is coupled to the armature shaft 21 of the electric motor 2 by way of a coupling 31. The extension is designed integrally with the motor shaft in the embodiment of FIG. 2.

Extension 30 carries the above mentioned eccentric 9, against which the pump pistons (not shown) will bear by way of a needle bearing.

The main bearing 7 and the auxiliary bearing 11 are arranged laterally of the eccentric 9 and support the extension 30 and, hence, the armature shaft 21 in the pump housing 3.

Auxiliary bearing 11 and main bearing 7 are staked in the pump housing, or fixed by locking elements. The needle bearing of the eccentric has a defined clearance. Abutment surfaces are provided. One abutment surface is provided by the stepped transition from the second to the third step. The other abutment surface is provided by the inner ring of the ball bearing which is the main bearing.

The axis of rotation of the armature shaft 21 is defined by the blind-end bore 5 and the bearings 6 and 11 accommodated in bore 5. The housing 20 of the electric motor must be aligned concentrically relative to the armature shaft 21. This is done by a circumferential groove 40 in the flange surface 4 which extends concentrically relative to the blind-end bore 5. An inner flank 41 of groove 40 has a diameter which corresponds to the internal diameter of the bowl-shaped housing 20. When the housing 20 with its rim 42 is inserted into groove 40, it is aligned relative to the axis of the armature shaft 21 by the inner flank 41.

The housing 20 is attached by a clamping ring 45 which is also inserted into the groove and is made of a deformable material. To this end, outer flank 46 of groove 40 is inclined relative to the bottom of the groove so that the width of groove 40 increases towards the bottom. When the clamping ring 45 is pushed into groove 40, it will deform and yield into the undercut area of the outer flank 46. The wedge-type effect caused thereby provides a reliable attachment of the motor housing 20 in the groove 40 and, thus, on the pump housing 3.

In the embodiment of FIG. 1, the brush support plate 26 is directly attached to the flange surface 4. Because retaining elements for the brush casings 60 extend also beneath the support plate 26, it is necessary to insulate the support plate 26 or the retaining elements relative to the pump housing 3, which is typically made of an electrically conductive material (for example, aluminum). An insulating foil 61 is cemented to the flange surface 4 of the pump housing 3 for this purpose.

The extension 30 is coupled to the armature shaft 21 as described hereinbelow.

The armature shaft 21 has an axially extending blind-end bore 70 having its inside wall provided with rails 71. The corresponding end of the extension 30 has a diameter which roughly corresponds to the diameter of the bore in the motor shaft. Further, the extension end has longitudinal grooves. When the extension 30 is assembled with the motor shaft 21, rails 71 will move into the grooves 72, whereby the two parts are retained relative to each other in an unrotatable manner.

The length of the armature shaft 21 may be rated so that its end surface facing the pump housing 3 moves to bear against the inner ring of the main bearing 7. This effects a fixation of the main bearing 7 in the pump housing 3.

The assembly of the pump 3 and the electric motor 20 is effected such that, initially, the main and auxiliary bearings and the extension 30 are mounted into the pump housing 3. Subsequently, the insulating foil is cemented to the flange surface 4, and the brush support plate 26 is attached. Thereafter, the armature shaft 21 may be slipped onto the extension 30. The motor housing 20 is then slipped over the armature shaft 21, and the rim 42 of the housing 20 is inserted into the groove 40. The housing 20 is fastened therein by way of clamping ring 42, as has been described hereinabove.

Figure 2:
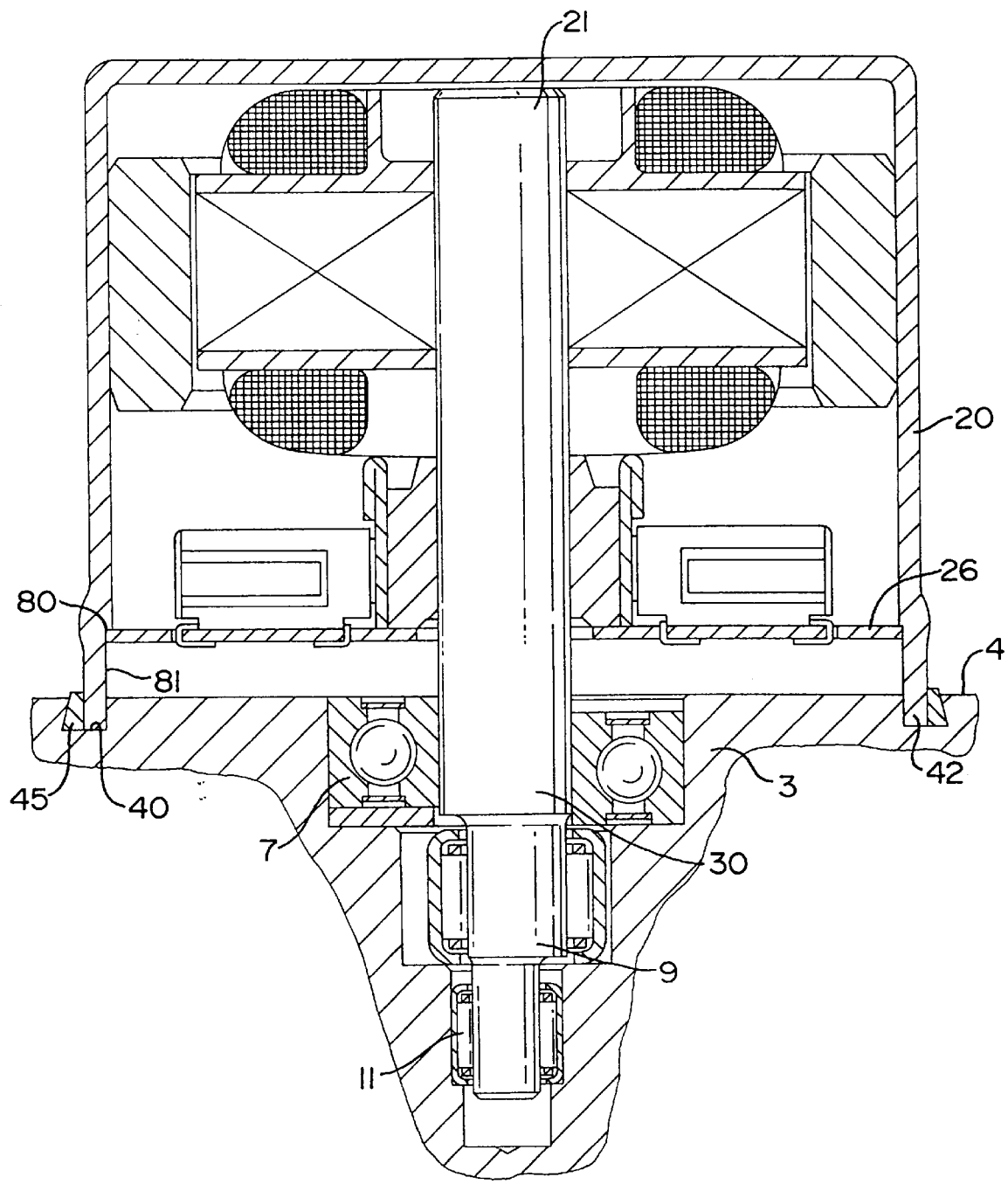
FIG. 2 shows a cross-section through a second embodiment of a motor-and-pump assembly.
Figure 3:
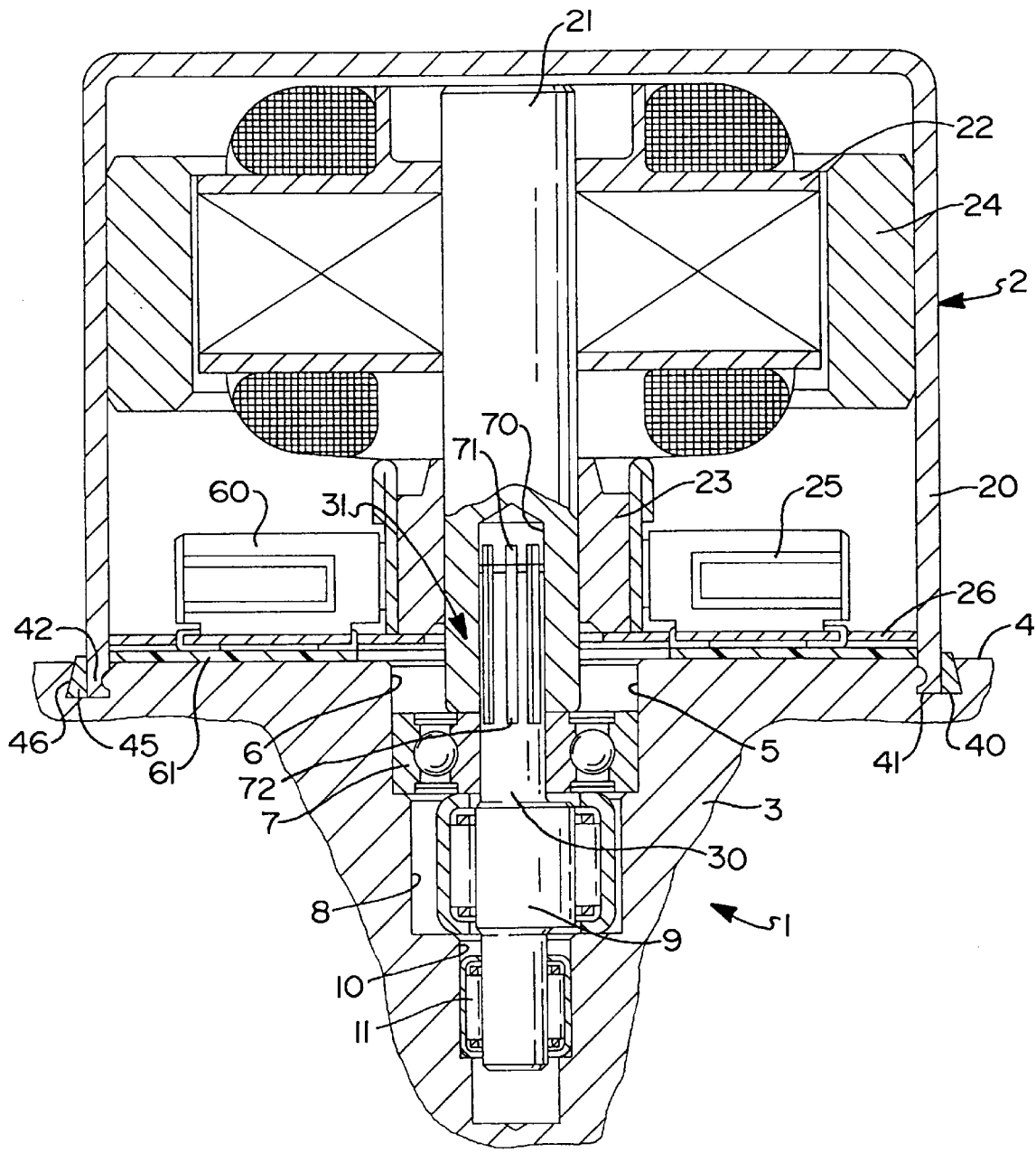

The design of FIG. 2 is different in two respects. On the one hand, the extension 30 and the armature shaft 21 are of integral design. On the other hand, a different type of attachment of the brush support plate 26 is provided. The following description does not mean that the two provisions are possible in combination only. It is also possible to combine the corresponding partial features of the embodiments.

In the embodiment of FIG. 2, a circumferential edge 80 is provided not far above the rim 42 of the housing 20. When the brush support plate is urged against the edge, a detent 81 will be engaged and press the brush support plate 26 against the edge 80.

This maintains a distance from the pump housing so that the need for a separate insulation (as in FIG. 1) is obviated.

As has been explained hereinabove, the shaft 21 is integrally designed with its extension 30. This necessitates ever decreasing steps for the eccentric 9 and the subsequent end of the extension 30 so that the respective peripheral surfaces keep an ever decreasing distance from the axis of the shaft 21. Initially, the auxiliary bearing 11 and the main bearing 7 are mounted into the pump housing 3 for the assembly. Further, the eccentric bearing is incorporated in the pump housing.

The shaft 21, along with the preassembled support plate 26 and the housing 20 is now mounted onto the flange surface 4 of the pump housing 3. While the shaft 21 with its extension 30 is introduced into the bore 6 of the pump housing 3, the rim of the housing 20 is simultaneously inserted into the circumferential groove 40 and attached therein, as described hereinabove.

It should be noted that, in lieu of a clamping ring 45, other types of attachment are also possible. So-called self-clinched engagements may be provided, for example. With these engagements, the rim of the housing 20 is indented, whereby deformations in the pump housing 3 are caused which yield behind an undercut portion at the rim of the housing 20. The housing 20 is this way fixed in the pump housing 3.

We claim:

1. An electric motor-and-pump assembly, comprising:

an electric motor having a motor housing and an armature shaft with an extension;

a pump having a pump housing with a flange surface, a stepped bore and at least one main bearing, wherein the motor housing is container-shaped and has an open end with a rim that can be mounted on the flange surface of the pump housing, wherein the extension of the armature shaft reaches into the stepped bore in the pump housing and is retained by at least one main bearing in the pump housing, and wherein the flange surface includes a groove extending concentrically with respect to the stepped bore to receive the rim of the motor housing such that an inside wall of the motor housing abuts against an inside rim surface of the groove in the flange surface; and a clamping ring made of an deformable material and placed in the groove such that the clamping ring and the rim of the motor housing are sealingly engaged in the groove, said clamping ring being placed in the groove to abut against an outside wall of the motor housing and an outer rim surface of the groove in the flange surface.

2. The assembly as claimed in claim 1, further comprising a brush support plate that is attached to the pump housing and electrically insulated from the pump housing.

3. The assembly as claimed in claim 2, wherein the brush support plate is electrically insulated from the pump housing by an insulating foil placed between the brush support plate and the pump housing.

4. The assembly as claimed in claim 3, wherein the insulating foil is cemented to the pump housing in between the brush support plate and the pump housing.

5. The assembly as claimed in claim 2, wherein the brush support plate is retained in the motor housing by frictionally engaging an edge of the brush support plate with the inside wall of the motor housing.

6. The assembly as claimed in claim 2, wherein the brush support plate and the pump housing are spaced apart from each other to insulate electrically the brush support plate from the pump housing.

7. The assembly as claimed in claim 1, wherein the armature shaft and the extension have a bipartite design and are interconnected by a coupling to prevent rotation of the armature shaft and the extension relative to one another.

8. The assembly as claimed in claim 1, wherein the motor housing has an indentation near the rim of the motor housing and the pump housing has a deformation extending outwardly radially from the center of the pump housing, and wherein a portion of the pump housing deformation engages with the indentation near the rim of the motor housing to fix the motor housing to the pump housing.

* * * * *